(12) United States Patent
Friedl et al.

(10) Patent No.: US 8,315,781 B2
(45) Date of Patent: Nov. 20, 2012

(54) METHOD AND DEVICE FOR STARTING AN INTERNAL COMBUSTION ENGINE

(75) Inventors: Günter Friedl, Regensburg (DE); Oswald Schumann, Rettenbach (DE)

(73) Assignee: Continental Automotive GmbH, Hannover (DE)

( * ) Notice: Subject to any disclaimer, the term of this patent is extended or adjusted under 35 U.S.C. 154(b) by 48 days.

(21) Appl. No.: 13/000,705

(22) PCT Filed: Jun. 5, 2009

(86) PCT No.: PCT/EP2009/056919
§ 371 (c)(1),
(2), (4) Date: Dec. 22, 2010

(87) PCT Pub. No.: WO2010/000560
PCT Pub. Date: Jan. 7, 2010

(65) Prior Publication Data
US 2011/0107993 A1    May 12, 2011

(30) Foreign Application Priority Data
Jun. 30, 2008    (DE) .......................... 10 2008 030 869

(51) Int. Cl.
*F02D 41/06* (2006.01)
*F02P 5/00* (2006.01)

(52) U.S. Cl. ...................... 701/105; 701/113; 123/179.5; 123/179.16; 123/491; 123/406.53

(58) Field of Classification Search .................. 123/491, 123/436, 305, 406.23, 406.24, 406.53, 406.54, 123/179.5, 179.16; 701/105, 113
See application file for complete search history.

(56) References Cited

U.S. PATENT DOCUMENTS

| | | | |
|---|---|---|---|
| 5,509,389 A | 4/1996 | Oshima et al. | 123/423 |
| 5,818,116 A * | 10/1998 | Nakae et al. | 290/38 R |
| 7,007,462 B2 * | 3/2006 | Kitahara | 60/285 |
| 7,031,820 B2 * | 4/2006 | Ueda et al. | 701/101 |
| 7,168,239 B2 | 1/2007 | Ingram et al. | 60/285 |

(Continued)

FOREIGN PATENT DOCUMENTS

DE    10322749 A1    12/2003

(Continued)

OTHER PUBLICATIONS

International Search Report and Written Opinion for Application No. PCT/EP2009/056919 (13 pages), Sep. 7, 2009.

(Continued)

*Primary Examiner* — Hai Huynh
(74) *Attorney, Agent, or Firm* — King & Spalding L.L.P.

(57) ABSTRACT

In a method for starting an internal combustion engine having at least one combustion chamber, an injection timing point is specified for each chamber at which a first fuel injection pulse is carried out and an ignition timing point is specified at which a first ignition pulse is to be carried out in the chamber. A crankshaft is caused to rotate by a starter device. For all chambers in which the injection timing point takes place in time after the ignition pulse, the respectively specified ignition timing point is adjusted in terms of reduced torque output. Thereafter, in each combustion chamber the injection pulse is carried out at the respectively specified injection timing point and the ignition pulse is carried out at the respectively specified ignition timing point. In this way, any potentially present fuel residue is combusted and at the same time the torque produced thereby is reduced.

12 Claims, 3 Drawing Sheets

U.S. PATENT DOCUMENTS

| | | | |
|---|---|---|---|
| 7,214,164 B2 * | 5/2007 | Shomura et al. | 477/113 |
| 7,798,123 B2 * | 9/2010 | Kawakami et al. | 123/406.26 |
| 8,056,660 B2 * | 11/2011 | Imura et al. | 180/65.24 |
| 2010/0204902 A1 * | 8/2010 | Kuroki et al. | 701/103 |
| 2011/0061628 A1 * | 3/2011 | Fujita et al. | 123/406.47 |
| 2011/0197860 A1 * | 8/2011 | Aso et al. | 123/491 |

FOREIGN PATENT DOCUMENTS

| | | | |
|---|---|---|---|
| EP | 0654593 | | 5/1995 |
| EP | 1288471 | | 3/2003 |
| EP | 1566532 | | 8/2005 |
| JP | 2006-2610 | * | 1/2006 |
| JP | 2006-299811 | * | 11/2006 |
| JP | 2006-336478 | * | 12/2006 |

OTHER PUBLICATIONS

German Office Action, German Patent Application No. 102008030869.2-15, 1 page, Mar. 20, 2009.

* cited by examiner

METHOD AND DEVICE FOR STARTING AN INTERNAL COMBUSTION ENGINE

CROSS-REFERENCE TO RELATED APPLICATIONS

This application is a U.S. National Stage Application of International Application No. PCT/EP2009/056919 filed Jun. 5, 2009, which designates the United States of America, and claims priority to German Application No. 10 2008 030 869.2 filed Jun. 30, 2008, the contents of which are hereby incorporated by reference in their entirety.

TECHNICAL FIELD

The invention relates to a method for starting an internal combustion engine having at least one combustion chamber, and to a control device which is designed in such a manner that it is able to execute the method.

BACKGROUND

With regard to internal combustion engines, in particular during extended periods of non-operation the situation can occur where unburnt fuel condenses and is deposited on the cold combustion chamber walls. When the internal combustion engine is subsequently started, ignition of this undefined quantity of unburnt hydrocarbons can result in undesired, uncontrolled and irregular variations in rotational speed. This effect disrupts a controlled speed ramp when starting the internal combustion engine and is perceived by the driver as being uncomfortable.

One possible means of avoiding the disruptive torque contributions resulting from the ignition of these fuel residues is to enable the ignition in each combustion chamber only from the point in time after which fuel has been injected into the combustion chamber by way of an injection valve. With regard to the combustion chambers in which the first fuel injection takes place only after the exhaust cycle (opening of the outlet valve), the fuel deposits are conveyed unburnt into the exhaust gas tract and discharged into the environment without being converted. This means that there is an increase in the level of harmful emissions during the starting process.

SUMMARY

According to various embodiments, a method and a device for starting an internal combustion engine can be provided, by means of which the starting process for the internal combustion engine can be carried out with lower emissions and comfortably for the driver.

According to an embodiment, in a method for starting an internal combustion engine having at least one combustion chamber, —an injection timing point is specified for each combustion chamber, at which a first fuel injection pulse is to be carried out in said combustion chamber, —an ignition timing point is specified for each combustion chamber, at which a first ignition pulse is to be carried out in said combustion chamber, —a crankshaft of the internal combustion engine is caused to rotate by means of a starter device, wherein for all those combustion chambers in which the first fuel injection pulse takes place temporally after the first ignition pulse, the respectively specified ignition timing point is adjusted in terms of a reduced torque delivery of the internal combustion engine, and in each combustion chamber, the first fuel injection pulse is carried out at the respectively specified injection timing point and the first ignition pulse is carried out at the respectively specified ignition timing point.

According to a further embodiment, the ignition timing point for the first ignition pulse can be adjusted up to a minimum ignition timing point at which the torque delivery of the internal combustion engine is minimal. According to a further embodiment, for those combustion chambers for which the ignition timing point for the first ignition pulse has been adjusted, after the first fuel injection pulse has been carried out the ignition timing point can be adjusted in terms of an increased torque delivery of the internal combustion engine.

According to another embodiment, a control device for an internal combustion engine having at least one combustion chamber, is designed in such a manner that for starting the internal combustion engine, an injection timing point is specified for each combustion chamber, at which a first fuel injection pulse is to be carried out in said combustion chamber, an ignition timing point is specified for each combustion chamber, at which a first ignition pulse is to be carried out in said combustion chamber, a crankshaft of the internal combustion engine is caused to rotate by means of a starter device, wherein for all those combustion chambers in which the first fuel injection pulse takes place temporally after the first ignition pulse, the respectively specified ignition timing point is adjusted in terms of a reduced torque delivery of the internal combustion engine, in each combustion chamber, the first fuel injection pulse is carried out at the respectively specified injection timing point and the first ignition pulse is carried out at the respectively specified ignition timing point.

BRIEF DESCRIPTION OF THE DRAWINGS

An exemplary embodiment will be described in detail in the following with reference to the attached figures. In the drawing.

DETAILED DESCRIPTION

Figure 1:
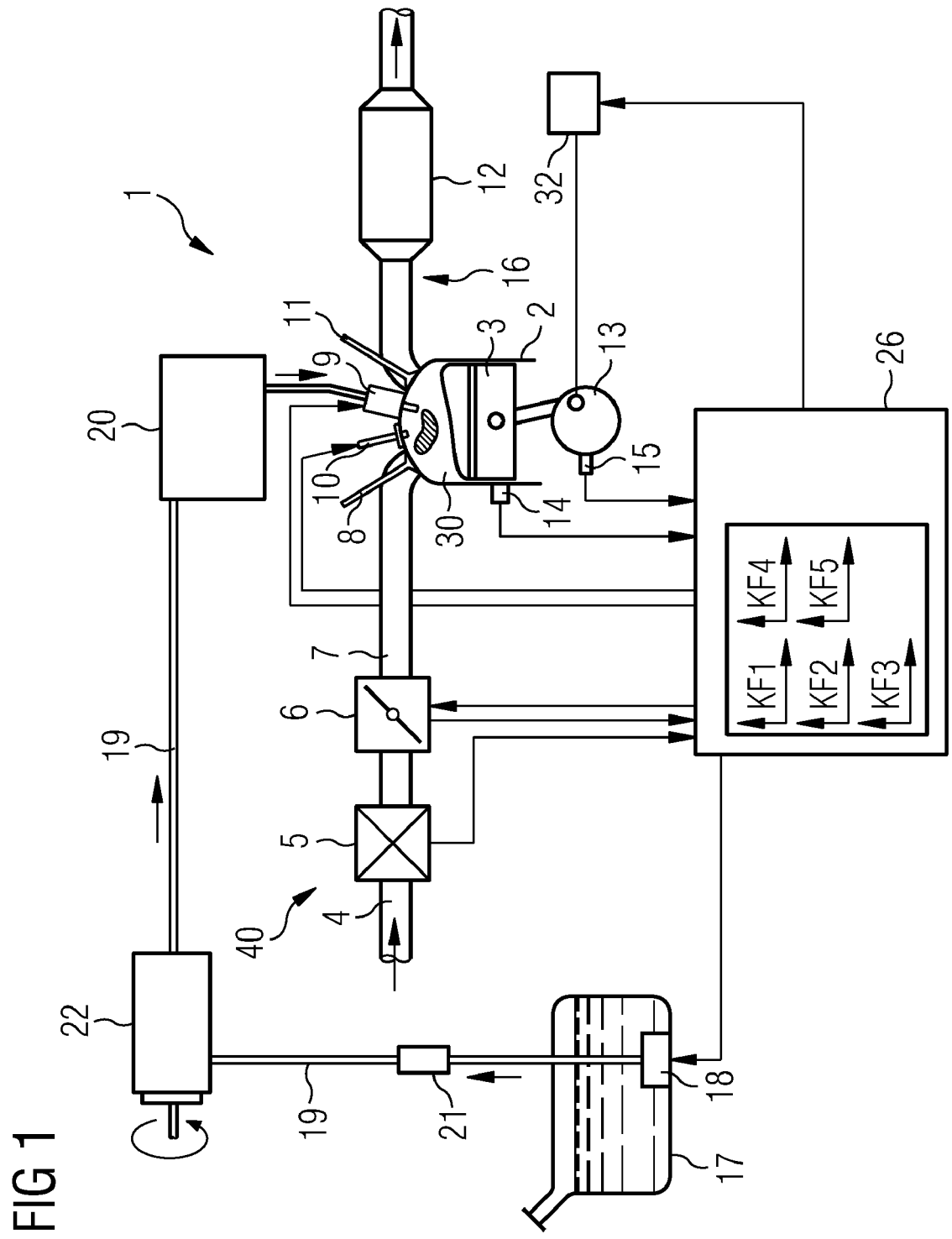
FIG. 1 shows a schematic illustration of an internal combustion engine.

With regard to the method for starting an internal combustion engine having at least one combustion chamber, an injection timing point is specified for each combustion chamber, at which a first fuel injection pulse is to be carried out in said combustion chamber. In addition, an ignition timing point is specified for each combustion chamber, at which a first ignition pulse is to be carried out in said combustion chamber. A crankshaft of the internal combustion engine is caused to rotate by means of a starter device. For all those combustion chambers in which the first fuel injection pulse takes place temporally after the first ignition pulse, the respectively specified ignition timing point is adjusted for the first ignition pulse in terms of a reduced torque delivery of the internal combustion engine. In each combustion chamber, the first fuel injection pulse is carried out at the respectively specified ignition timing point and the first ignition pulse is carried out at the respectively specified ignition timing point.

The idea on which the various embodiments are based is seen to consist in reducing the torque produced by the combustion of possible fuel deposits or fuel residues in the combustion chamber for those combustion chambers in which the first ignition pulse takes place temporally before the first injection pulse, by retarding the ignition timing point. This means that on the one hand the fuel residues which may be present in the combustion chamber are combusted, as a result of which the level of harmful emissions compared with a discharge of completely unburnt fuel fractions is significantly reduced. On the other hand, as a result of retarding the ignition angle the torque produced by the combustion of the fuel residues is greatly reduced. Negative influences on the rotational speed profile during the starting process are inhibited to the greatest possible extent. This manifests itself in a significantly more comfortable starting process of the internal combustion engine and also increases the operational reliability of the starting process. It should be noted that in the combustion chambers in which the fuel injection pulse takes place temporally before the first ignition pulse the specified ignition timing point is not adjusted. This serves to ensure that as a result of the combustion in these combustion chambers as great a torque contribution as possible is delivered for a rapid starting process.

In an embodiment of the method, the ignition timing point for the first ignition pulse is adjusted up to a minimum ignition timing point at which the torque delivery of the internal combustion engine is minimal.

A stable combustion can still just take place at the minimum ignition angle, whereby the torque produced in this situation is minimal. The minimum ignition timing point thus constitutes the combustion limit. In this manner, the degree to which the combustion of fuel residues influences the starting process can be kept as small as possible.

In an embodiment of the method, for those combustion chambers for which the ignition timing point for the first ignition pulse has been adjusted, after the first fuel injection pulse has been carried out the ignition timing point is adjusted in terms of an increased torque delivery of the internal combustion engine.

This embodiment serves to ensure that after a combustion of the fuel residues has taken place with the ignition timing points retarded, the ignition angle is advanced in terms of an increased torque delivery in order to combust the fuel fed by way of the injection valves with a greater level of efficiency and thus to generate a higher torque. This means that it is possible to ensure a more rapid speed ramp and a more reliable starting process.

A control device for an internal combustion engine is designed in such a manner that it is able to execute the method as described above. In respect of the resulting advantages, reference should be made to the descriptions relating to the method.

FIG. 1 is a schematic illustration of an internal combustion engine 1 in the form of a reciprocating piston internal combustion engine. In the interests of clarity, the illustration is greatly simplified.

The internal combustion engine 1 comprises at least one cylinder 2 and one piston 3 which can move up and down in the cylinder 2. The internal combustion engine 1 furthermore comprises an intake tract 40, in which downstream of an intake port 4 are arranged an air mass sensor 5, a throttle valve 6, and also an induction manifold 7. The intake tract 40 opens into at least one combustion chamber 30 delimited by the respective cylinder 2 and the respective piston 3. The at least one combustion chamber 30 communicates by way of an inlet valve 8 with the intake tract 40. With regard to the internal combustion engine 1 illustrated here, this is an internal combustion engine 1 having direct fuel injection, in which the fuel required for the combustion is injected by way of an injection valve 9 directly into the combustion chamber 30. A spark plug 10 likewise projecting into the combustion chamber 30 is used to trigger the combustion. Each combustion chamber 30 is therefore assigned a separate spark plug 10 and a separate injection valve 9. The combustion exhaust gases are discharged by way of an outlet valve 11 into an exhaust gas tract 16 of the internal combustion engine 1 and cleaned by means of an exhaust-gas catalytic converter 12 arranged in the exhaust gas tract.

The transmission of power to the drive train 110 of the motor vehicle 100 takes place by way of a crankshaft 13 coupled with the piston 3. The internal combustion engine 1 furthermore has a rotational speed sensor 15 for sensing the rotational speed of the crankshaft 13, a coolant temperature sensor 14 and an electrical starter device 32 for starting the internal combustion engine 1.

The internal combustion engine 1 furthermore comprises a fuel supply system which has a fuel tank 17 and a fuel pump 18 arranged therein. The fuel is conveyed by means of the fuel pump 18 from the fuel tank 17 into a feed line 19. Arranged in the feed line 19 are a fuel filter 21 and a high-pressure pump 22. The high-pressure pump 22 serves to feed the fuel at high pressure to a pressure reservoir 20. In this situation, the pressure reservoir 20 in question is a common facility, used to supply the injection valves 9 for a plurality of combustion chambers 30 with pressurized fuel.

Associated with the internal combustion engine 1 is a control device 26 which is connected by way of signal and data lines with all the actuators and sensors of the internal combustion engine 1. Specifically, the control device 26 is coupled by way of data and signal lines with the fuel pump 18, the air mass sensor 5, the throttle valve 6, the spark plug 10, the injection valve 9, the coolant temperature sensor 14, the rotational speed sensor 15 and the starter device 32.

Figure 3:
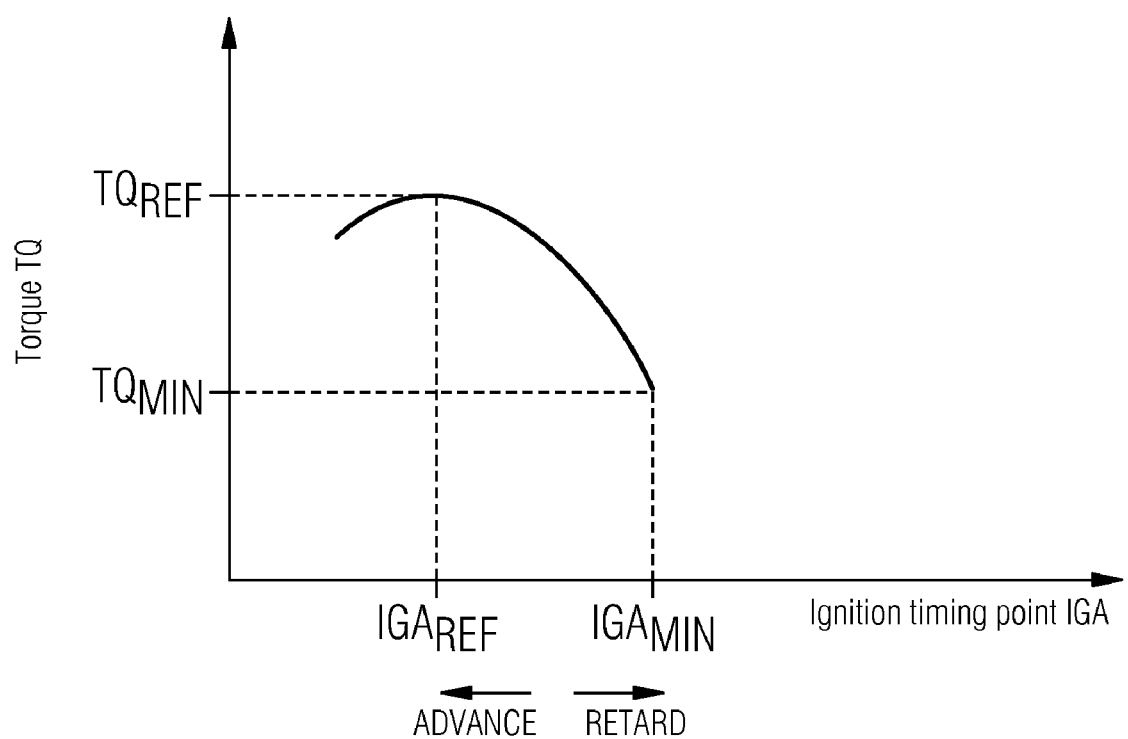
FIG. 3 shows a schematic illustration of the relationship between the ignition timing point and the torque produced.

In the control device 26, control functions (KF1 to KF5) which may be characteristic-diagram-based or model-based are implemented in software. The control device 26 uses the control functions to calculate control signals for the actuators in order to realize a desired torque of the internal combustion engine. The torque is influenced principally by adjustment of the quantity of fresh air passing through the throttle valve 6 and also by adjustment of the ignition angle. Given a specified fuel-fresh air ratio (lambda value), the torque of the internal combustion engine 1 rises in essentially linear fashion with the supplied fresh air mass. The dependence of the torque on the ignition timing point (ignition angle) is represented schematically in FIG. 3. In this situation, it can be seen that a maximum torque is reached at an ignition timing point $IGA_{REF}$. At a minimum ignition timing point $IGA_{MIN}$, the boundary with an unstable combustion is reached and the torque produced by the internal combustion engine is minimal. The adjustment of the ignition timing point IGA is therefore limited by these two extreme values.

An adjustment of the ignition timing point in terms of a reduced torque production is therefore understood as an adjustment in the direction of the minimum ignition timing point $IGA_{MIN}$. Since the ignition timing points are determined temporally relative to the top dead centre of the piston (crankshaft degrees), the adjustment of the ignition timing point in the direction of the minimum ignition timing point $IGA_{MIN}$ is also referred to as "retarding" the ignition timing point (represented in FIG. 3 by an arrow).

An adjustment of the ignition timing point in terms of an increased torque production is understood as an adjustment in the direction of the maximum ignition timing point $IGA_{REF}$. Since the ignition timing points are determined temporally relative to the top dead centre of the piston (crankshaft degrees), the adjustment of the ignition timing point in the direction of the maximum ignition timing point $IGA_{REF}$ is also referred to as "advancing" the ignition timing point (represented in FIG. 3 by an arrow).

Amongst other things, control functions relating to the combustion chamber specific determination of the ignition timing point and the injection timing point are implemented in the control device 26. The torque contribution can thus be set specifically for each combustion chamber 30.

Figure 2:
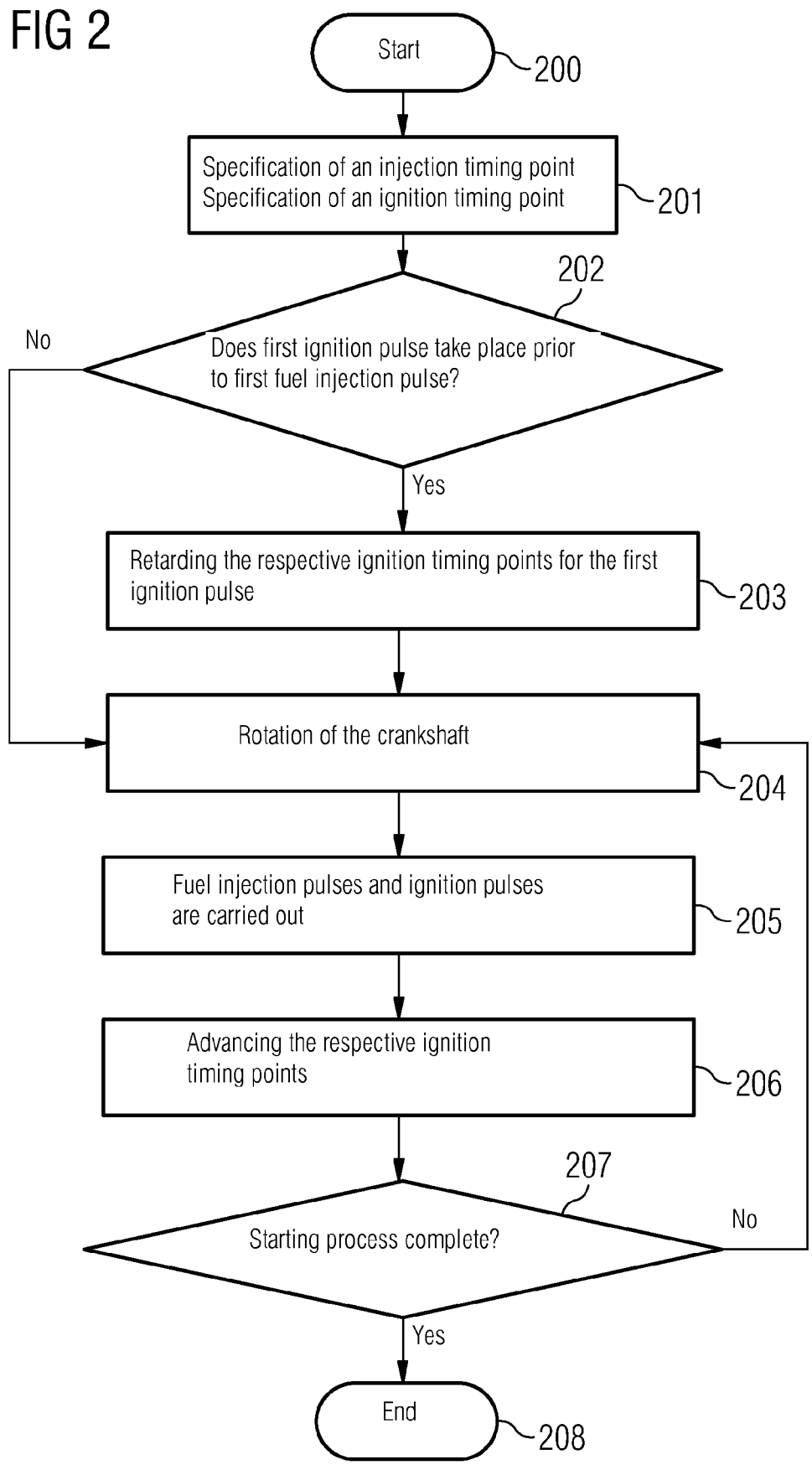
FIG. 2 shows an exemplary embodiment of a control method for starting an internal combustion engine in the form of a flowchart.

FIG. 2 illustrates an exemplary embodiment of a control method for starting an internal combustion engine 1 in the form of a flowchart.

The method is started in step 200, for example on insertion of the ignition key or on activation of the ignition of the internal combustion engine 1. The method continues with step 201, in which the control functions implemented in the control device 26 for starting the internal combustion engine 1 are used to determine and specify on a combustion chamber specific basis an injection timing point at which fuel is fed to the respective combustion chamber 30 by means of the injection valves 9, and an ignition timing point at which an ignition pulse occurs through the spark plug 10 in the respective combustion chamber 30.

In step 202, a check is now performed for each combustion chamber 30 as to whether the respectively specified ignition timing point for the first ignition pulse occurs temporally before the specified injection timing point for the first fuel injection pulse. If the result of this query is positive, the method continues with step 203 in which the respective ignition timing point for the first ignition pulse is adjusted in terms of a reduced torque production for each combustion chamber 30. As has been described above, this is also referred to as "retarding" the ignition angle.

After step 203 or if the result of the query in step 202 is negative, the method continues with step 204 in which the crankshaft 13 of the internal combustion engine 1 is caused to rotate by means of the starter device 32. According to the specifications, in step 205 the fuel injection pulses and the specified ignition pulses are carried out for each combustion chamber for starting the internal combustion engine 1. As a result of the fact that an ignition pulse occurs in each combustion chamber 30, fuel residues or fuel deposits are also combusted, which has a favorable effect on the emissions. As a result of the fact that the ignition timing point is "retarded" for those combustion chambers 30 in which the first ignition pulse occurs before the first fuel injection pulse, the torque produced in these combustion chambers can be greatly reduced, with the result that the speed ramp of the internal combustion engine 1 occurs in a more even and more controlled fashion.

After the first ignition pulse and the first fuel injection pulse have been carried out, the ignition timing points are corrected again in the direction of an increased torque delivery. As has been described above, this is also referred to as "advancing" the ignition angle. This serves to ensure that a sufficiently high torque delivery takes place for a rapid starting process.

The method continues with step 207 in which a check is made as to whether the starting process has been completed. A criterion for assessing whether the starting process has been completed can consist in the fact that the rotational speed of the internal combustion engine 1 has exceeded a certain minimum rotational speed. If the result of this query is negative, the method returns to step 204, whereby the crankshaft 13 continues to be rotated by the starter device 32. If the result of the query in step 207 is positive, the starting process is complete and the method is terminated with step 208.

It should be noted that the method can also be applied in an analogous fashion to Wankel rotary engines and two-stroke engines. With regard to the starter device 32, this can be any desired electrical or mechanical drive by means of which the crankshaft can be caused to rotate.

What is claimed is:

1. A method for starting an internal combustion engine having a plurality of combustion chambers, comprising:
during a starting process for the internal combustion engine:
specifying an injection timing point for each combustion chamber, at which a first fuel injection pulse of the engine starting process is to be carried out in said combustion chamber,
specifying an ignition timing point for each combustion chamber, at which a first ignition pulse of the engine starting process is to be carried out in said combustion chamber,
for each combustion chamber, comparing the specified ignition timing point of the first ignition pulse for that combustion chamber with the specified injection timing point of the first fuel injection pulse for that combustion chamber;
for each combustion chamber having a specified ignition timing point temporally earlier than the specified injection timing point, adjusting the specified ignition timing point for that combustion chamber to reduce a corresponding torque produced by the first ignition pulse;
causing a crankshaft of the internal combustion engine to rotate by means of a starter device, and
for each combustion chamber having an adjusted specified ignition timing point:
executing the first ignition pulse at the adjusted specified ignition timing point; and
executing a second ignition pulse at a further adjusted ignition timing point to provide an increased torque.

2. The method according to claim 1, wherein the ignition timing point for the first ignition pulse is adjusted up to a minimum ignition timing point at which the torque delivery of the internal combustion engine is minimal.

3. A control device for an internal combustion engine having at least one combustion chamber, wherein for starting the internal combustion engine, the control device is operable, during a starting process for the internal combustion engine:
to specify an injection timing point for each combustion chamber, at which a first fuel injection pulse of the engine starting process is to be carried out in said combustion chamber,
to specify an ignition timing point for each combustion chamber, at which a first ignition pulse of the engine starting process is to be carried out in said combustion chamber,
for each combustion chamber, to compare the specified ignition timing point of the first ignition pulse for that combustion chamber with the specified injection timing point of the first fuel injection pulse for that combustion chamber;
for each combustion chamber having a specified ignition timing point temporally earlier than the specified injection timing point, to adjust the specified ignition timing point for that combustion chamber to reduce a corresponding torque produced by the first ignition pulse;
to cause a crankshaft of the internal combustion engine to rotate by means of a starter device, wherein
for each combustion chamber having an adjusted specified ignition timing point:

to execute the first ignition pulse at the adjusted specified ignition timing point; and to execute a second ignition pulse at a further adjusted ignition timing point to provide an increased torque.

4. The control device according to claim 3, wherein the ignition timing point for the first ignition pulse is adjusted up to a minimum ignition timing point at which the torque delivery of the internal combustion engine is minimal.

5. A motor vehicle, comprising an internal combustion engine with at least one cylinder and one piston which can move up and down in the cylinder and an intake tract, in which downstream of an intake port are arranged an air mass sensor, a throttle valve, and an induction manifold, wherein the intake tract opens into at least one combustion chamber, wherein the at least one combustion chamber communicates by way of an inlet valve with the intake tract, an injection valve, a spark plug, and an outlet valve associated with the at least one cylinder, a starter device operating a crankshaft of said internal combustion engine, a control device connected by way of signal and data lines with actuators and sensors of the internal combustion engine, wherein the control device is operable during a starting process for the internal combustion engine:

to specify an injection timing point for the at least one combustion chamber, at which a first fuel injection pulse of the engine starting process is to be carried out in said combustion chamber, to specify an ignition timing point for the at least one combustion chamber, at which a first ignition pulse of the engine starting process is to be carried out in said combustion chamber, for each combustion chamber, to compare the specified ignition timing point of the first ignition pulse for that combustion chamber with the specified injection timing point of the first fuel injection pulse for that combustion chamber;

for each combustion chamber having a specified ignition timing point temporally earlier than the specified injection timing point, to adjust the specified ignition timing point for that combustion chamber to reduce a corresponding torque produced by the first ignition pulse;

to control the starter device to rotate the crankshaft of the internal combustion engine, and for each combustion chamber having an adjusted specified ignition timing point:

to execute the first ignition pulse at the adjusted specified ignition timing point; and to execute a second ignition pulse at a further adjusted ignition timing point to provide an increased torque.

6. The motor vehicle according to claim 5, wherein the ignition timing point for the first ignition pulse is adjusted up to a minimum ignition timing point at which the torque delivery of the internal combustion engine is minimal.

7. The motor vehicle according to claim 5, wherein
the control device is coupled by way of data and signal lines with a fuel pump, an air mass sensor, a throttle valve, the spark plug, the injection valve, a coolant temperature sensor, a rotational speed sensor and the starter device.

8. The motor vehicle according to claim 5, comprising a rotational speed sensor for sensing the rotational speed of the crankshaft, and a coolant temperature sensor.

9. The motor vehicle according to claim 5, further comprising a fuel supply system which has a fuel tank and a fuel pump arranged therein.

10. The motor vehicle according to claim 5, wherein the control device implements control functions which may be characteristic-diagram-based or model-based in software.

11. The motor vehicle according to claim 10, wherein the control device uses the control functions to calculate control signals for actuators in order to realize a desired torque of the internal combustion engine.

12. The motor vehicle according to claim 5, wherein the control device implements for each combustion chamber control functions relating to the combustion chamber specific determination of the ignition timing point and the injection timing point.

* * * * *